June 26, 1951 F. R. LAMBERTY 2,558,571

OPERATOR CONTROLLED COIN COLLECTING AND REFUNDING MEANS FOR DIAL TELEPHONE SYSTEMS

Filed Oct. 27, 1948 6 Sheets-Sheet 1

INVENTOR
F. R. LAMBERTY
BY
R. O. Covell
ATTORNEY

June 26, 1951 F. R. LAMBERTY 2,558,571

OPERATOR CONTROLLED COIN COLLECTING AND REFUNDING MEANS FOR DIAL TELEPHONE SYSTEMS

Filed Oct. 27, 1948 6 Sheets-Sheet 2

INVENTOR
F. R. LAMBERTY
BY
R. O. Covell
ATTORNEY

June 26, 1951 F. R. LAMBERTY 2,558,571

OPERATOR CONTROLLED COIN COLLECTING AND REFUNDING MEANS FOR DIAL TELEPHONE SYSTEMS

Filed Oct. 27, 1948 6 Sheets-Sheet 3

INVENTOR
F. R. LAMBERTY
BY R. O. Corell
ATTORNEY

INVENTOR
F. R. LAMBERTY
BY
R. O. Covell
ATTORNEY

June 26, 1951 F. R. LAMBERTY 2,558,571

OPERATOR CONTROLLED COIN COLLECTING AND REFUNDING MEANS FOR DIAL TELEPHONE SYSTEMS

Filed Oct. 27, 1948 6 Sheets-Sheet 5

INVENTOR
F. R. LAMBERTY
BY
R. D. Covell
ATTORNEY

June 26, 1951 F. R. LAMBERTY 2,558,571

OPERATOR CONTROLLED COIN COLLECTING AND REFUNDING MEANS FOR DIAL TELEPHONE SYSTEMS

Filed Oct. 27, 1948 6 Sheets-Sheet 6

INVENTOR
F. R. LAMBERTY
BY R. O. Covell
ATTORNEY

Patented June 26, 1951 2,558,571

UNITED STATES PATENT OFFICE 2,558,571

OPERATOR CONTROLLED COIN COLLECTING AND REFUNDING MEANS FOR DIAL TELEPHONE SYSTEMS

Frederick R. Lamberty, Nassau, N. Y., assignor to Bell Telephone Laboratories, Incorporated, New York, N. Y., a corporation of New York Application October 27, 1948, Serial No. 56,854

5 Claims. (Cl. 179—6.3)

This invention relates to communication systems and particularly to signaling in telephone systems comprising coin subscribers' stations.

Objects of the invention are the provision of improved facilities for coin control signaling between operator positions and coin subscriber lines in automatic local telephone offices and an increased efficiency in the use of signaling channels between manual and automatic telephone offices.

The invention is an improvement in signaling between an operator position in a toll office and a dial local office in which a composite signaling channel is arranged for use by the operator in controlling the collection or refund of coins at coin subscriber stations in the dial local office. A feature of the invention is the use of a composite signaling channel for controlling the operation of a coin control selector in a dial local office for establishing connection with a prepay coin subscriber's station and the provision of signal means controlled over this signaling channel by coin collect and coin refund battery potentials for effecting the collection or refund of coins deposited at subscriber stations.

Figure 1:
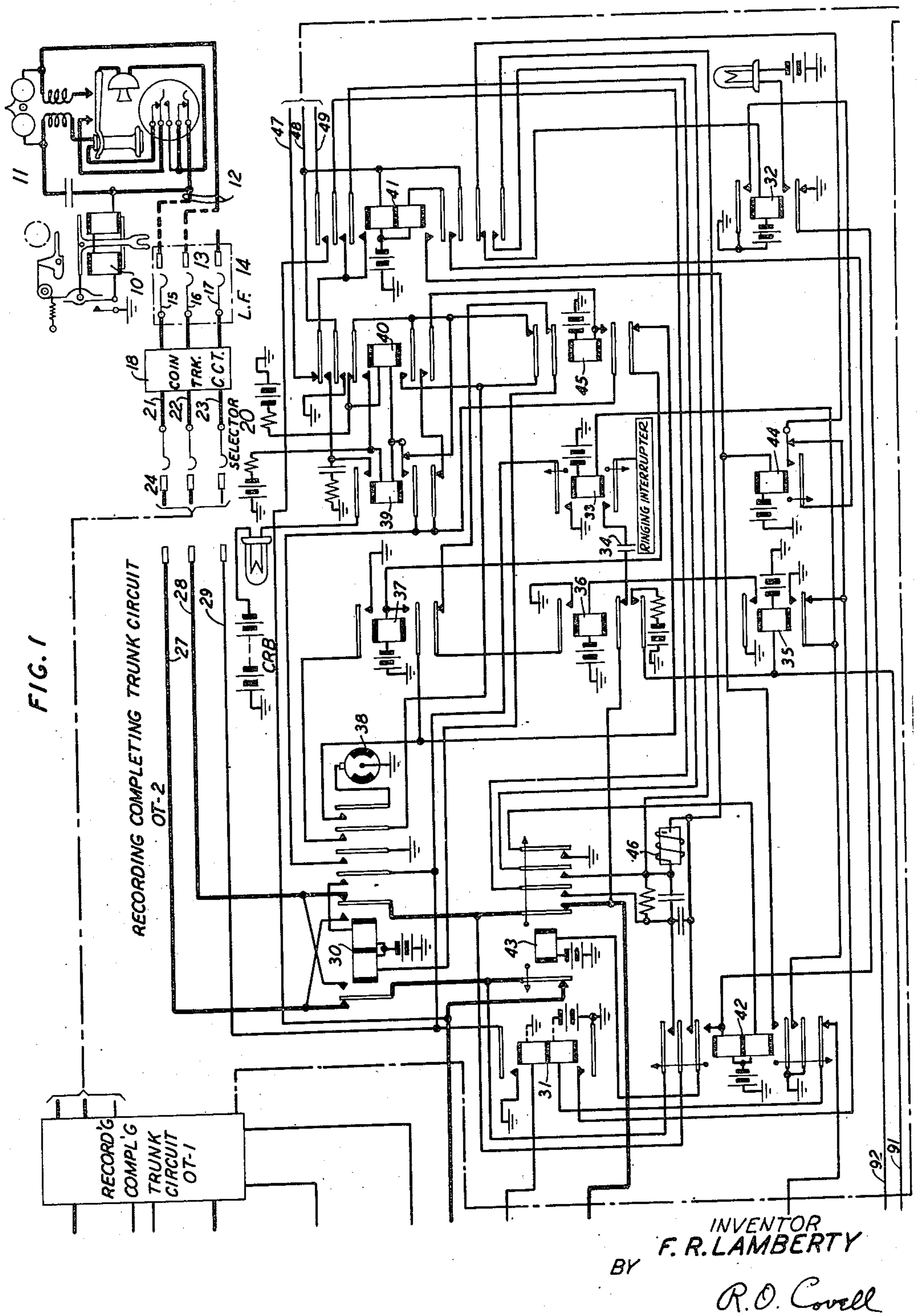
Figure 2:
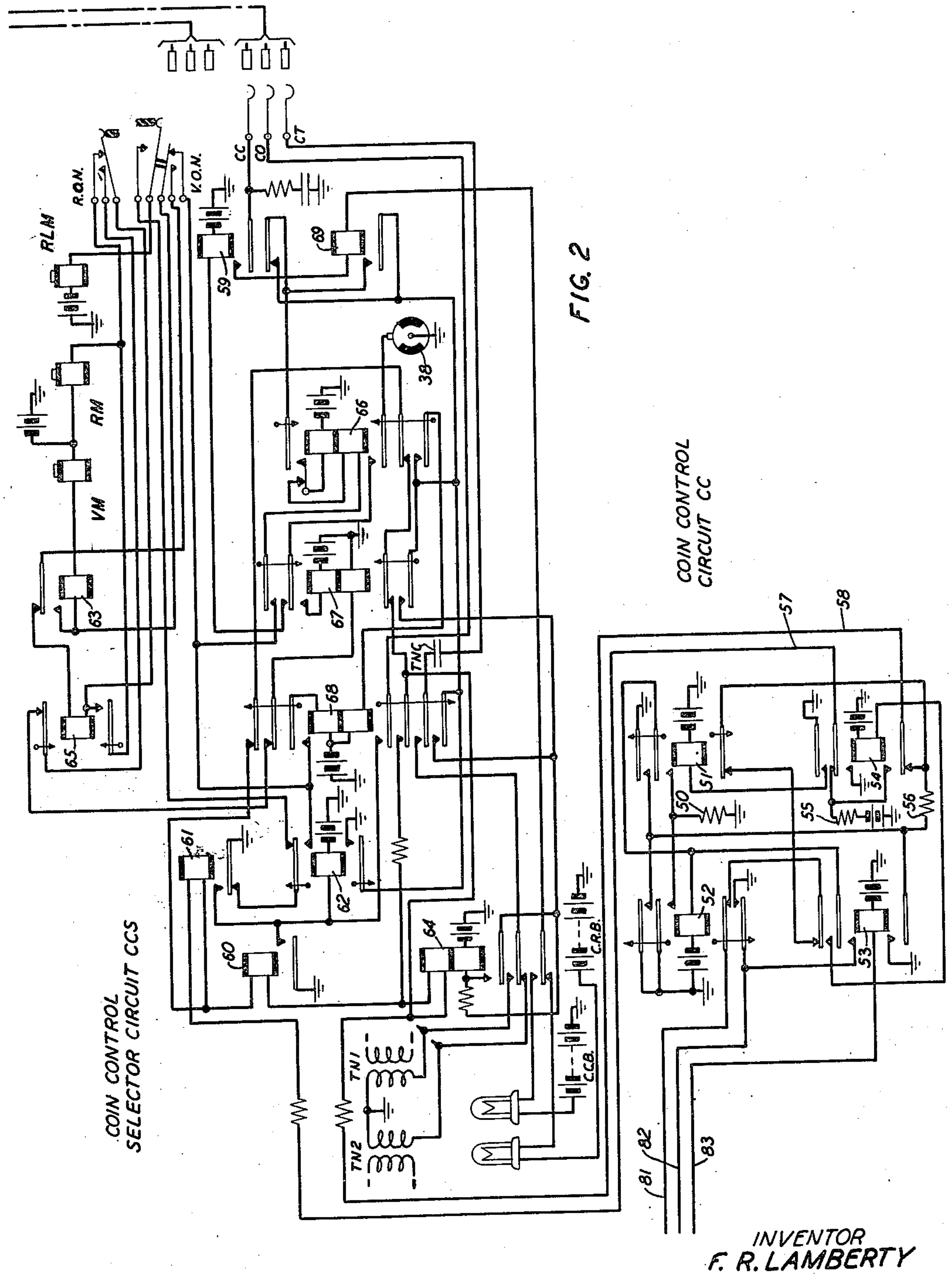
Figure 3:
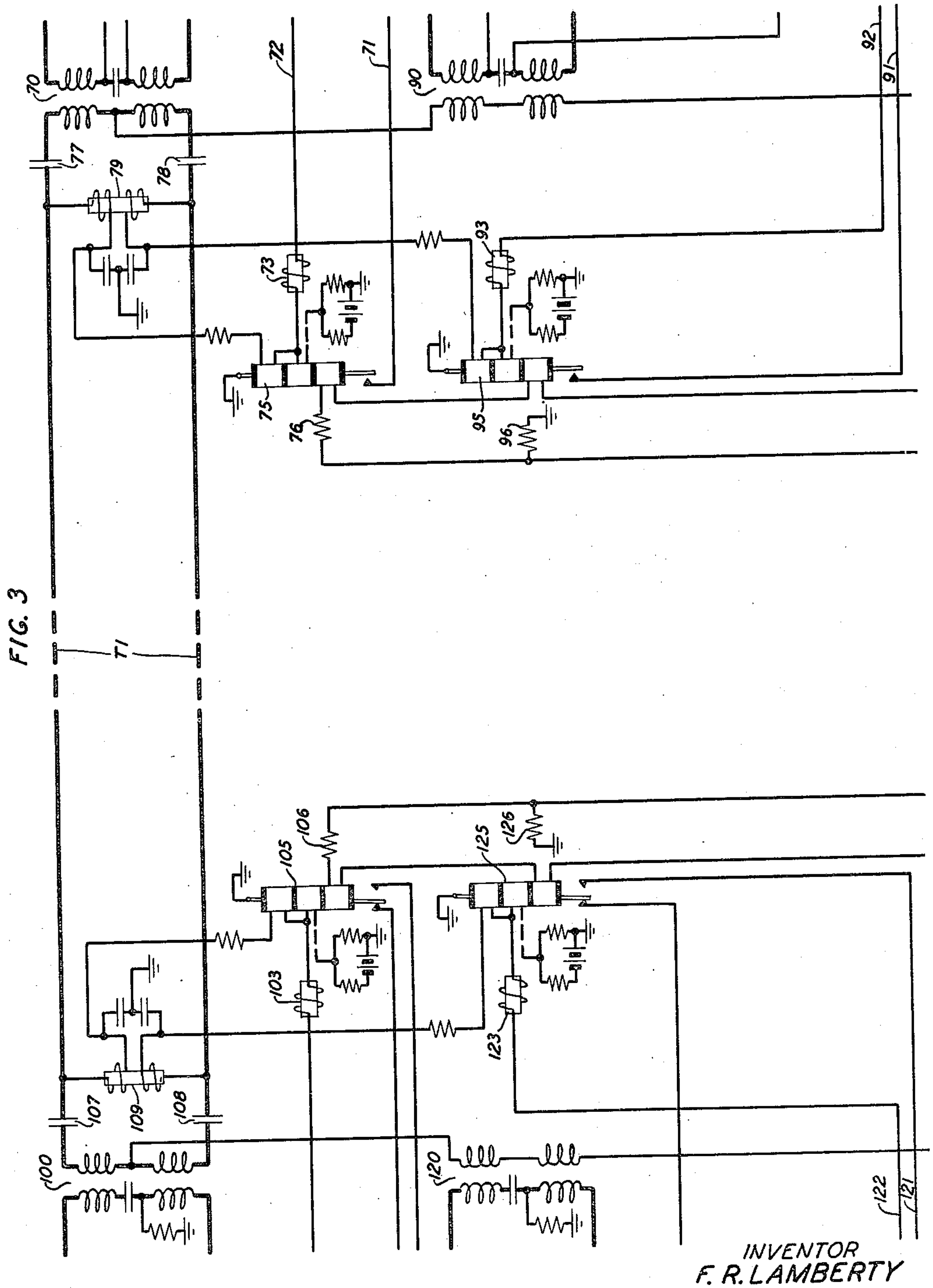
Figure 4:
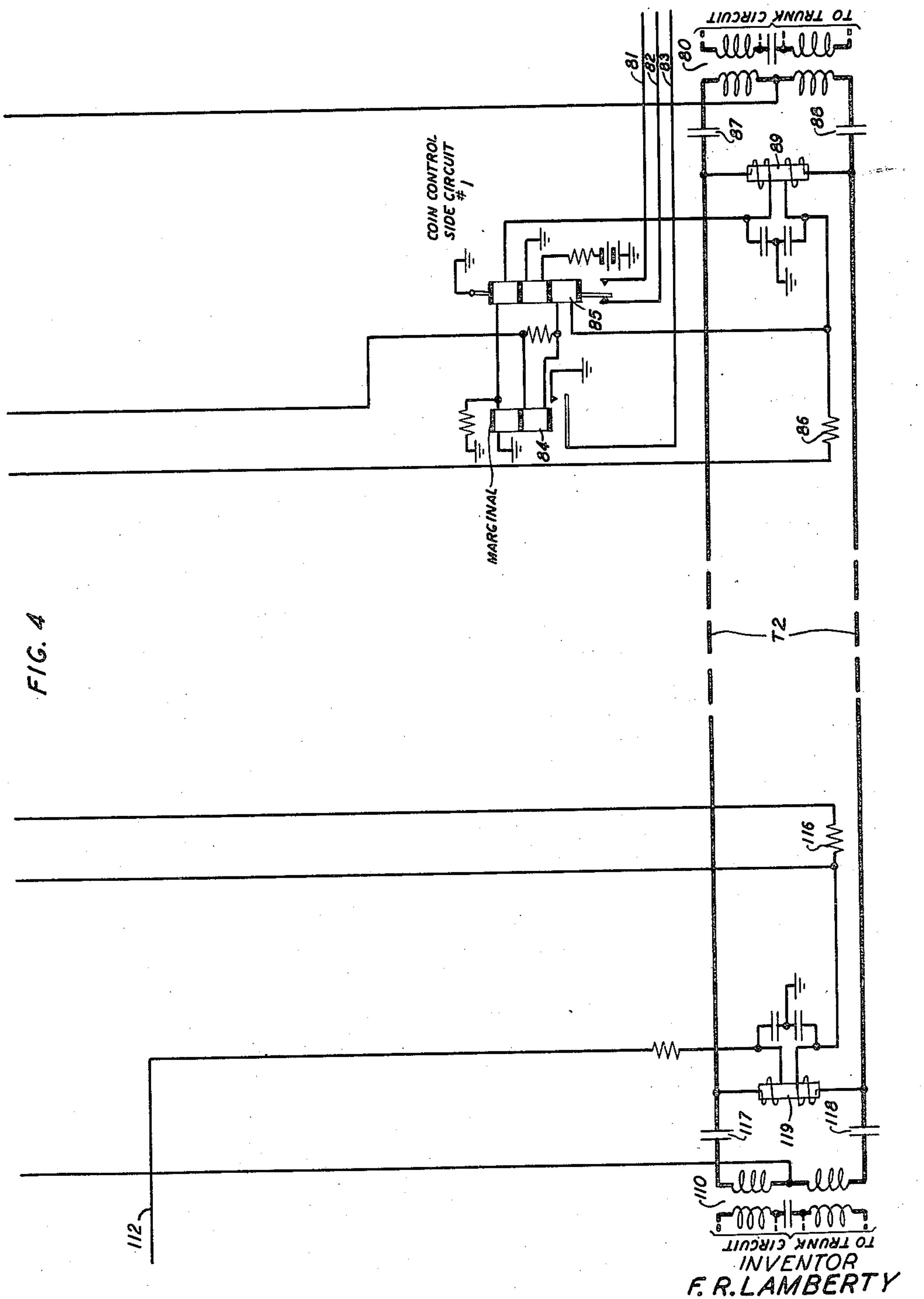
Figure 5:
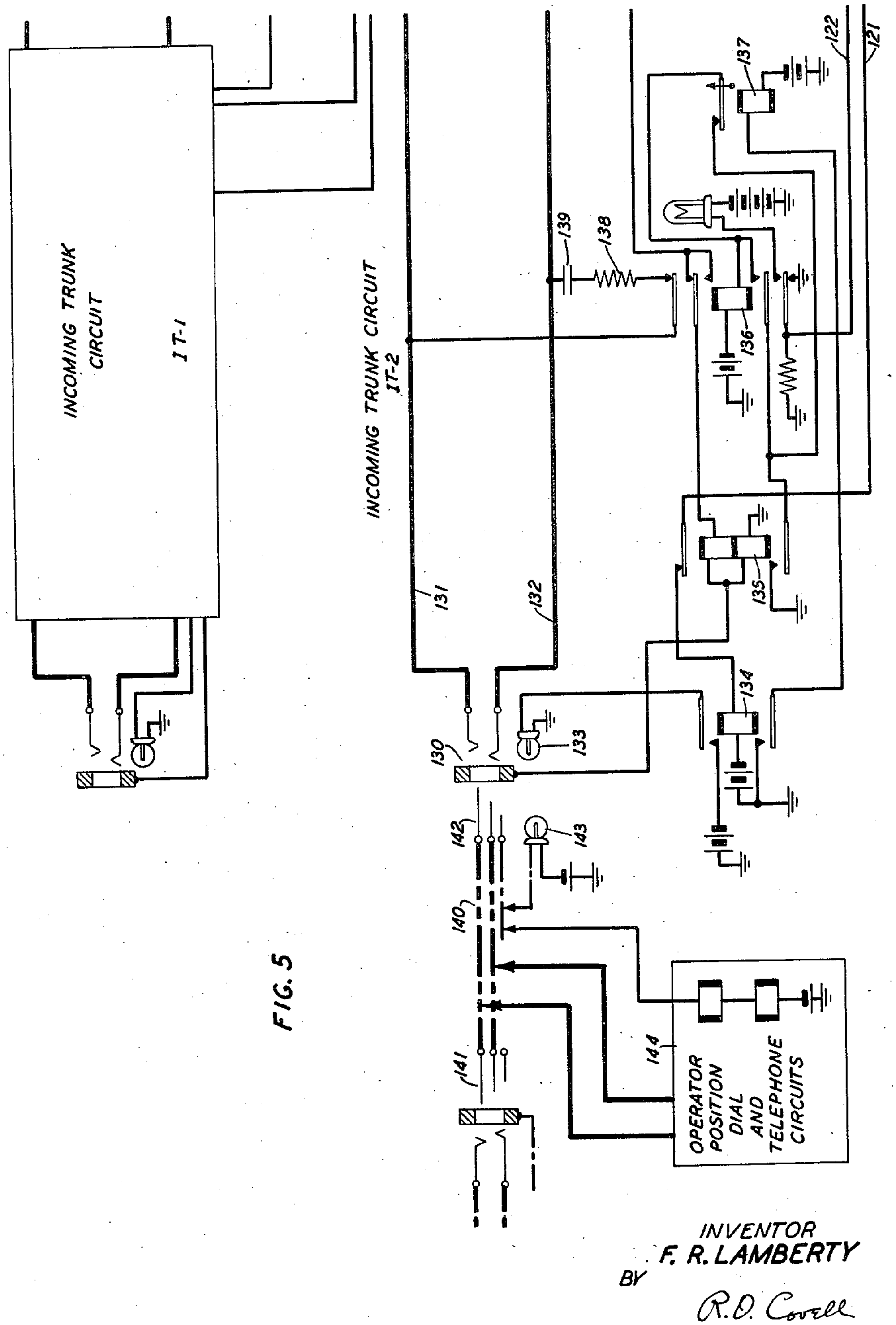
Figures 6, 7:
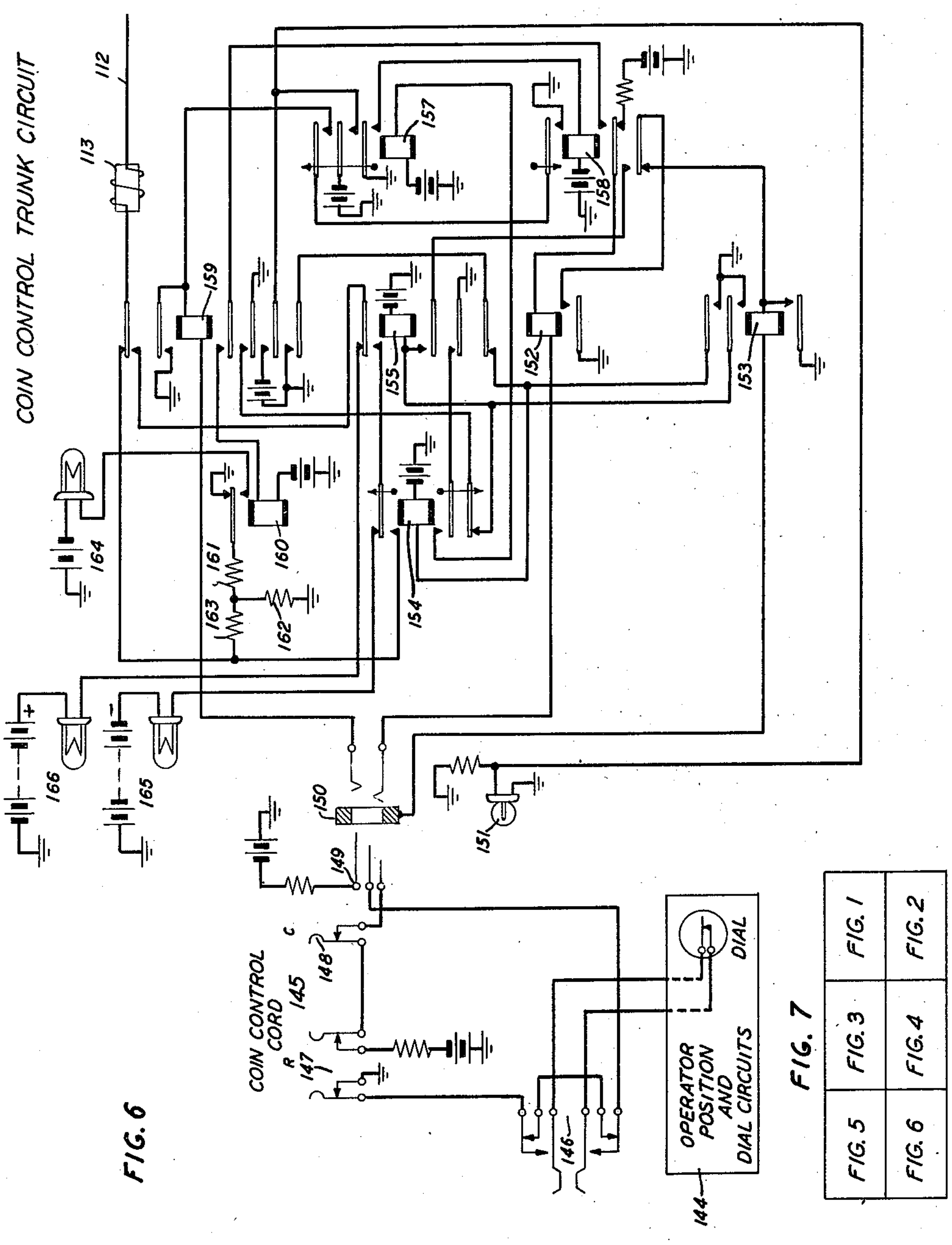

A telephone system arranged in accordance with the invention and its feature is shown schematically in the drawing, in which Figs. 1 and 2 represent a local dial office, Figs. 5 and 6 represent a toll office and Figs. 3 and 4 represent trunks between these offices arranged for composite signaling. Fig. 7 shows the relative position in which Figs. 1 to 6 are placed to form an operative arrangement.

The local dial office shown in Figs. 1 and 2 comprises a coin subscriber's station 11 and line 12, a line finder 14 having access to the line 12, a first selector 20, a coin trunk circuit 18 interconnecting the line finder and first selector circuits, two recording completing trunk circuits OT1 and OT2 connected to terminals in the bank of the first selector, a coin control circuit CC and a coin control selector circuit CCS.

The subscriber station 11 is of the prepay coin box type comprising a coin control magnet 10 for collecting and refunding deposited coins. The telephone set is of the common battery type and a dial (not shown) is provided for controlling the establishment of desired connections. The line finder and selector switches are of the step-by-step two-motion type. The line finder 14 is represented by a set of brushes 15, 16, 17 and a single set of terminals 13. The first selector 20 is represented by a set of brushes 21, 22 and 23 and two sets of terminals 24 and 25. Reference may be had to "Automatic Telephony" by Smith and Campbell, 2nd edition, pages 53 to 65, for a description of the structure and operation of step-by-step two-motion switches and their operation when used as selectors. Reference may be had to Patent 1,799,654, granted April 7, 1931 to R. L. Stokely for a description of the operation of a two-motion switch when used as a line finder. Reference may be had to Patent 1,569,623 granted January 12, 1926 to B. G. Dunham and Patent 2,427,000 granted September 9, 1947 to H. Hovland for disclosure of coin trunk circuits similar to coin trunk circuit 18.

The coin control circuit CC is adapted to receive dial and coin control signals over a composite signaling channel of trunks T1 and T2 between the dial and toll offices. The coin control selector CCS has access to a group of recording completing trunk circuits and is controlled by dial impulses to select the particular one of these trunk circuits which is at that time connected to the coin station at which the disposal of coins is to be effected. The coin control signals thereafter received by the coin control circuit CC are repeated to the recording trunk circuit to selectively effect the collection or refund of coins as required. The operations of these circuits are hereinafter described in detail.

The toll office, shown in Figs. 5 and 6 comprises two incoming trunk circuits IT1 and IT2 and a coin control trunk circuit CCT, each arranged for signaling over a composite signaling channel of trunks T1 and T2. The trunk circuits are jack-ended at an operator position 144 which is equipped with a group of cords, an operator telephone set, and other position equipment including a dial for use in establishing calls outgoing to dial offices. Reference may be had to Patent 1,675,956 granted July 3, 1928 to L. F. Porter for complete disclosure of a toll operator's cord and position equipment. The operator position is also provided with a coin control cord 145 for use with trunk circuit CCT in effecting the collection or refund of coins at any coin subscriber station in the local dial office which is making a toll call. The trunk circuits IT2 and CCT are shown, and hereinafter described, in detail.

The two two-wire trunks T1 and T2 represent a group of similar trunks interconnecting the toll and local dial offices. Composite sets and repeating coil equipment are connected at each end of the trunks T1 and T2 to provide three two-way talking channels, three composite signaling channels, and a ground potential compensating channel. One talking channel interconnects trunk circuits OT1 and IT1 and comprises repeating coils 100 and 70 and the conductors of trunk T1. Another talking channel comprises repeating coils 80 and 110 and the conductors of trunk T2, this channel being associated with trunk circuits (not shown) which do not require a separate signaling channel. The third talking channel interconnects trunk circuits OT2 and IT2 and comprises phantom repeating coils 90 and 120 and the conductors of trunks T1 and T2. One composite signaling channel comprises the tip conductor of trunk T1 and interconnects trunk circuits OT1 and IT1. Another composite signaling channel comprises the ring conductor of trunk T1 and interconnects trunk circuits OT2 and IT2. A third composite signaling channel comprises the tip conductor of trunk T2 and is used for coin control between coin control trunk circuit CCT in the toll office and coin control circuit CC in the local dial office. The ground potential compensating circuit is traced from ground in the local dial office through resistor 96, resistor 86 in parallel with resistor 76 and windings of relays 75, 95, 84 and 85 in series, the lower winding of retard coil 89, lower conductor of trunk T2, lower winding of retard coil 119, resistor 116 in parallel with windings of relays 125 and 105 and resistor 106 in series, and through resistor 126 to ground in the toll office. While only one of the composite signaling channels over trunks T1 and T2 has been used for coin control, the arrangement may be modified either to provide two or to provide three coin control signaling channels between the toll office and the local dial office.

A detailed description of the operation of the system shown in the drawing will be preceded by a general outline of the operations involved in toll calls from prepay coin subscriber stations. Responsive to the removal of the receiver at a prepay coin subscriber's station 11, a line finder 14 is operated to connect the associated coin trunk circuit 18 to the subscriber's line 12. The coin trunk determines whether a coin has been deposited and, if so, dial tone is then transmitted to the station 11. Responsive to the dialing of an operator code, the first selector 20 and auxiliary selectors if necessary (no auxiliary selector being shown), are selectively operated to select an idle outgoing recording-completing trunk circuit, such as OT2, which is connected over a talking channel of trunks arranged for composite signaling to an incoming trunk circuit such as IT2 terminating at a position of the toll board. The aforementioned Hovland Patent 2,427,000 describes the operations of line finder, coin trunk and selector circuits in connecting a prepay coin subscriber station to a recording-completing trunk circuit. A calling lamp is lighted at the toll board and the call is answered by connecting an idle cord to the answering jack of the incoming trunk circuit. It is assumed that the coin lines are in a separate line finder group and that a separate group of trunks is provided for these lines to the toll board, and in this case the trunk circuits are not arranged to transmit a class of service signal to the toll operator. When the toll operator answers the call, the called office code and number are received from the calling station and the coin initially deposited is automatically returned and the operator requests the deposit of coins in payment for the call. After completion of the call, or as soon as the toll operator finds that the call cannot be completed, the coin control cord 145 is connected to a coin control trunk circuit CCT and the operator dials a particular number identifying the recording-completing trunk circuit used in connecting the coin subscriber to the toll board. The dial impulses are transmitted over the associated composite signaling channel of trunks T1 and T2 to the coin control circuit CC in the local dial office; and these impulses are repeated to operate the coin control selector CCS to establish connection with the desired recording-completing trunk circuit. The toll operator then operates the coin collect key or the coin refund key to transmit either a coin collect or a coin return signal over the composite signaling channel to the coin control circuit CC. In response to this signal the recording-completing trunk circuit is controlled by the coin control circuit CC to effect the collection or refund of the coin at the calling station, as required.

It is to be noted that, whereas in the arrangement shown in the drawing the disposal of coins is effected by transmitting signals over a composite signaling channel to a recording-completing trunk circuit, on delayed toll calls a switching trunk is employed by the operator in connection with the local dial office; and selector and connector switches are operated to complete the connection with the calling station. In such a case, the coin control selector CCS would be selectively controlled to select the switching trunk circuit in the dial office (instead of selecting a recording-completing trunk circuit) to establish a connection for controlling the disposal of coins at the subscriber station.

Assume now that a call has been initiated at a prepay coin station 11, that the line finder 14 operated to connect the line 12 to coin trunk 18, that the coin trunk operated to prepare selector 20 for operation and that the terminal set 25 associated with trunk circuit OT2 was selected responsive to dial impulses transmitted from station 11 and repeated by the coin trunk to the selector 20. Upon selection of trunk circuit OT2, the impulse repeating bridge (not shown) in the coin trunk 18 is extended through brushes 21 and 22, conductors 27 and 28, back contacts of relay 30, back contacts of relay 43, right windings of repeating coil 90 and a back contact of relay 42, and windings of relay 31 to the opposite poles of the central office battery. Relay 31 is thereby operatively energized. The operation of relay 31 closes a circuit including a back contact of relay 35 for operating the slow-to-release relay 33, and connects ground to conductor 29 to mark the trunk circuit busy and to hold the selector and line finder switches 20 and 14 in operated position in usual and well-known manner. The operation of relay 33 closes a connection from the dial office ringing interrupter through condenser 34 and back contacts of relays 36, 43 and 30 to conductor 28, thereby to transmit audible ringing tone to the calling station to indicate that an operator is being signaled. Relay 33 also connects ground to conductor 29. The aforementioned operation of relay 31 also closes a circuit for operating relay 32, this circuit including back contacts of relays 41 and 44. The operation of relay 32 disconnects ground from, and connects battery to, the outgoing signaling conductor 82 thence through coil 93, a winding of signaling relay 95, lower winding of retard coil 79, lower conductor of trunk T1, lower winding of coil 109 in the toll office, upper winding of composite signaling relay 125, retard coil 123 and conductor 122, to ground at a back contact of relay 136 in trunk circuit IT2. Relay 125 operates and connects ground to conductor 121 to operate relay 134. The operation of relay 134 closes a circuit for lighting lamp 133 associated with answering jack 130 and closes a circuit for operating relay 137. When a toll operator inserts the plug 142 of a cord 140 into jack 130, the sleeve relay 135 is operated due to the energization of its lower winding in series with the sleeve conductors of jack 130 and plug 142 to battery in the position circuit 144. The operation of relay 135 causes the successive release of relays 134 and 137. The release of relay 134 extinguishes the calling lamp 133, and the release of relay 137 closes a circuit for operating relay 136. The operation of relay 136 opens the terminating bridge comprising resistor 138 and condenser 139 which is normally connected across the talking conductors of trunk circuit IT2. The operation of relay 136 disconnects ground from, and connects battery to, conductor 122, thence through coil 123, upper winding of relay 125, lower winding of coil 109, lower conductor of trunk T1, lower winding of coil 79, upper and middle windings of relay 95 to ground. Relay 95 operates and connects ground to conductor 91 to operate relay 35 of the recording-completing trunk circuit OT2. Relay 35 closes a holding circuit for relay 33 independent of relay 31, and closes an operating circuit for relay 36. The operation of relay 36 opens the connection between condenser 34 and conductor 28, to terminate the transmission of ringing tone to the calling station; and closes a circuit, including a back contact of each of relays 37 and 45, for operatively energizing the left winding of relay 30. Relay 30 operates, locks through its right winding, and interchanges the connections between the windings of relay 31 and conductors 27 and 28 so as to reverse the current in the bridge (not shown) across the outgoing talking conductors of coin trunk circuit 18, thereby effecting the closing of the talking connection between line 12 and the answering operator in the manner described in the aforementioned Hovland patent.

The recording-completing trunk circuit is arranged to automatically effect the return of the coin initially deposited at station 11 in response to the answer of the toll operator. To this end, the operation of relay 30 closes a connection from the winding of relay 37 through a back contact of relay 45, and a front contact of relay 30 to an interrupter 38, the brush of this interrupter being connected to ground 60 times per minute. Relay 37 is thereby operated as soon after relay 30 operates as interrupter 38 closes the ground connection. The operation of relay 37 opens the operating circuit of relay 30, and closes a circuit including a front contact of relay 30 and a back contact of relay 45 for operating relay 39. Relay 39 locks through its continuity front contact to ground at a front contact of relay 30. As soon after relay 39 operates as the interrupter ground connection is opened, relay 37 releases thereby effecting the operation of relay 40. The operation of relay 40 closes a circuit for operatively energizing the upper winding of relay 41. Relay 41 opens the circuit for operating relay 32, closes a short circuit across retard coil 46, and extends its operating ground to operatively energize the upper winding of relay 42. The operation of relay 42 closes a holding circuit for relay 33, closes an operating circuit for relay 44, closes a locking circuit through the lower winding of relay 41, disconnects the lower winding of relay 31 from conductor 28, and extends its operating ground to operatively energize the winding of relay 43. The operation of relay 43 completes a connection from coin return battery CRB, through front contacts of relays 39 and 40, front contacts of relay 41 in parallel, front contacts of relay 43, front contacts of relay 42, front contacts of relay 30, conductors 27 and 28, selector brushes 21 and 22, through the coin trunk 18, line finder brushes 15 and 16 and the conductors of line 12 to operate the coin magnet 10 at station 11 to return the deposited coins. When relay 37 reoperates due to the next connection of ground through interrupter 38, approximately half a second after its prior release, ground is connected to short circuit the winding of relay 39. The release of relay 39 disconnects the coin return batery CRB from the line 12 and closes a circuit for operating relay 45. Relay 40 remains operated until relay 37 again releases so as to hold relays 41, 42 and 43 operated long enough after relay 39 releases to effect discharge of the line. Relay 45 locks under control of relay 30, and holds open the operating circuits of relays 39 and 40. When relay 37 again releases approximately half a second after relay 39 released, relay 40 releases thereby deenergizing the upper windings of relays 41 and 42 and deenergizing the winding of relay 43. Relay 43 releases, thereby deenergizing the lower winding of relay 42; and the release of relay 42 causes the release of relays 44 and 41. With relay 43 released, the talking connection between the toll operator and calling station is again closed. During the time relay 41 was operated, relay 32 released to disconnect battery from conductor 92 and cause the release of relay 125 in the toll office; whereby ground is connected to the upper low resistance winding of sleeve relay 135 of trunk circuit IT2 to cause the lighting of the cord supervisory lamp 143 while the coin is being returned at the calling station.

The toll operator receives the called office name and called subscriber number from the calling subscriber and informs the calling subscriber of the amount to be deposited in payment for the call. After the call is completed the operator proceeds to collect the coins; or, if the call cannot be completed, the coins are returned. In either case the operator connects the plug 149 of a coin control cord 145 to the jack 150 of an idle outgoing coin control trunk circuit CCT and then dials the number assigned to the recording-completing trunk OT2 in the dial office. When plug 149 is connected to jack 150, relay 152 is operated in a circuit which includes the left contact of coin return key 147, back contacts of dial key 146, ring conductors of plug 149 and jack 150, winding of relay 152 and a back contact of relay 158. If the dial key 146 is already operated, the circuit for operating relay 152 includes front contacts of key 146 and the impulse contacts of the dial. The operation of relay 152 closes a circuit for operating relay 153, this circuit including the front contact of relay 152, a back contact of relay 158, winding of relay 153, the sleeve conductors of jack 150 and plug 149 and contacts of keys 148 and 147. Relay 153 locks independent of relays 152 and 158 and closes circuits for operating relays 154 and 155. With both of relays 154 and 155 operated, a circuit is closed for operating relay 157. The operation of relay 157 closes a circuit for lighting busy lamp 151 and closes a circuit for operating relay 158. The operation of relay 158 opens the operating circuit of relay 153, closes a locking circuit for relay 155 to ground at a front contact of relay 152, opens the operating circuit of relay 152, and closes a circuit for operating relay 159, the last-mentioned circuit including the upper front contact of relay 158, a front contact of relay 157, winding of relay 159, and tip conductors of jack 150 and plug 149. Relay 159 locks independent of relays 157 and 158, closes a circuit for maintaining the energization of busy lamp 151 independent of relay 157, and connects the winding of relay 160 in series with the winding of relay 152 so as to reoperate relay 152 and operate relay 160. Normally the outgoing signaling conductor 112 is connected through coil 113, and a back contact of relay 159 to ground at a back contact of relay 160. With both of relays 159 and 160 operated, ground is disconnected from conductor 112 and a circuit is closed from battery 164 through the front contact of relay 160, resistors 161 and 163, a front contact of relay 154, a front contact of relay 155, a front contact of relay 159, coil 113, conductor 112, upper winding of coil 119, upper conductor of trunk T2, upper winding of coil 89 and through the upper windings of composite signaling relays 85 and 84 to ground. Relay 85 operates but relay 84 is marginal and does not operate at this time. The operation of relay 85 disconnects ground from conductor 82 and connects ground to conductor 81 to operate relay 61 of coin control selector CCS. The circuit for operating relay 61 is traced from conductor 81, through a back contact of each of relays 52, 53, 51 and 54 of coin control circuit CC, conductor 58, a back contact of each of relays 67, 66 and 68, winding of relay 61, conductor 57, a back contact of relay 54 and through resistor 55 to battery. The operation of relay 61 closes a circuit for operating slow-to-release relay 62, thereby preparing selector CCS for operation responsive to dial impulses transmitted over the coin control signaling channel from the toll office.

When the toll operator dials the digits identifying the recording-completing trunk circuit OT2 in the dial office, the dialing loop is alternately opened and closed by the impulse contacts of the dial to effect the alternate release and reoperation of relay 160. Each time relay 160 releases the signaling conductor 112 is transferred from battery 164 to ground, causing the release of relay 85 in the dial office; and each time relay 160 reoperates, ground is disconnected from and battery 164 is reconnected to signaling conductor 112, causing the reoperation of relay 85 in the local dial office. Relay 85 is thus operated to repeat the dial impulses incoming over the signaling channel from the toll office to relay 61 of the coin control selector circuit. The release of relay 61, responsive to the first dial impulse, closes a circuit from ground through the back contact of relay 61, upper front contact of relay 62, lower normally closed contact of the vertical off-normal springs VON, winding of relay 63 and winding of vertical stepping magnet VM. Relay 63 and the stepping magnet VM both operate. The operation of the stepping magnet raises the brushes one step. The VON springs are actuated when the shaft and brushes are moved out of normal position. When relay 61 reoperates at the end of first dial impulse, stepping magnet VM releases. Relay 61 releases and reoperates responsive to each succeeding dial impulse in a digit train, thereby causing the operation of the stepping magnet VM responsive to each dial impulse of the first digit train of impulses. Relay 63 is slow to release and remains operated until all of the impulses in the train have been received. The circuit for reoperating the stepping magnet VM and reenergizing the winding of relay 63 responsive to the second and succeeding impulses of a digit train includes a front contact of the VON springs and the front contact of relay 63 instead of a back contact of the VON springs as in the case of the first impulse of the train. Relay 62 is also slow in releasing and remains operated during the response of relay 61 to dial impulses. Each operation of stepping magnet VM raises the brushes one step, thereby selecting a level of the bank corresponding to the first digit dialed by the toll operator. During the interval between the first and second digit trains of dial impulses, relay 63 releases thereby transferring the operating ground connection from the winding of relay 63 and magnet VM to the winding of relay 65 and rotary stepping magnet RM. Thus the alternate release and reoperation of relay 61 responsive to the second digit impulse train causes the operation of relay 65 and successive operations of stepping magnet RM whereby the brushes are rotated in the selected level into engagement with the terminal set corresponding to the second digit dialed. When the brushes move out of the normal rotary position responsive to the first impulse of the second digit, the rotary off-normal springs RON are actuated; and the operating circuit for reenergizing relay 65 and reoperating stepping magnet RM responsive to the second and succeeding impulses of the second digit train includes the front contact of relay 65, relay 65 being slow in releasing so as to remain operated while relay 61 is responding to these impulses. When relay 65 releases after all of the impulses of the second digit train have been received, it connects the lower winding of relay 67 in a circuit through the front contact of springs RON in series with the stepping magnet RM. Relay 67 operates but the rotary stepping magnet is marginal and does not reoperate in this circuit. The operation of relay 67 closes a circuit for energizing the lower winding of relay 64 and opens the normally closed short circuit across the winding of relay 60 and the upper winding of relay 64 whereby these windings are connected in series with the winding of relay 61 and conductors 57 and 58. Relay 60 operates but relay 64 is not operated because the energization of one winding opposes that of the other winding. The operation of relay 60 closes a holding circuit for relay 62 independent of relay 61. The terminals selected responsive to the first and second digit trains of dial impulses are connected by conductors 47, 48 and 49 to the recording-completing trunk circuit OT2.

If the operator wishes to collect the coins at station 11, the coin collect key 148 is operated causing the release of relay 153 of the coin control trunk circuit CCT. The release of relay 153 causes the release of relay 154; but relay 155 remains operated, being locked under control of relays 158 and 152. The release of relay 154 closes another holding circuit for relay 155 to ground at a front contact of relay 159 and causes the successive release of relays 157, 158 and 160. The release of relay 154 also disconnects battery 164 from, and connects battery 165 to, the signaling conductor 112. The battery 165 is poled in the same direction as battery 164 but is a higher voltage battery so as to cause the operation of marginal relay 84 in the dial office, without releasing relay 85. When the operator restores the collect key 148, relay 153 reoperates and the reoperation of relay 153 causes the reoperation of relay 154, whereby signaling conductor 112 is disconnected from battery 165 and is connected to ground at the back contact of relay 160. The reoperation of relay 154 causes the successive reoperation of relays 157, 158 and 160; and, when relay 160 reoperates, ground is disconnected from, and battery 164 is again connected to, signaling conductor 112. The aforementioned operation of relay 84 connects ground to conductor 83, operating relay 53 of the coin control circuit CC. The operation of relay 53 closes a circuit for operating relay 54, this circuit including a front contact of relay 53, a back contact of relay 52, conductor 81 and the front contact of relay 85. The operation of relay 54 closes a circuit for operating relay 51 and reverses the current through conductors 57 and 58, thereby to cause the release of relays 60 and 61 and the operation of relay 64 in the coin control selector circuit CCS. The operation of relay 51 causes the operation of relay 52, and the operation of relay 52 causes the release of relay 54. When relay 54 releases, conductor 57 is reconnected to battery through resistor 55 and conductor 58 is connected through the high resistance 56 to ground at a front contact of each one of relays 53, 52 and 51 as long as the relay remains operated. The current in the loop circuit through conductors 57 and 58 is reduced by the high resistance of resistor element 56 to cause the reoperation of relay 60 without causing the reoperation of relay 61 and without causing the release of relay 64. The aforementioned release of relay 54 causes the release of relay 51. Relays 51 and 52 are slow to release to insure the operation of relay 60 in the coin control selector CCS. The release of relay 51 opens the operating circuit of relay 52, but relay 52 remains operated under the control of relay 53. The aforementioned reoperation of relay 60 in the coin control selector prevents the release of relay 62, and the release of relay 61 closes a circuit including the outer upper contact of relay 67 and both windings of relay 66 in series, for operating relay 66. Relay 66 locks through its upper winding and front contact, through a back contact of relay 59 to ground at a front contact of relay 62, opens its own operating circuit, connects the 60 impulse per minute interrupter 38 to the upper winding of relay 67, and closes a circuit for operating relay 68. Relay 68 locks through its upper winding under control of relays 62 and 61, opens the operating circuit of relay 67, closes a circuit for holding relay 64 operated, and closes a connection from ground at the front contact of relay 60, through the inner lower front contact of relay 68, middle brush and engaged terminal of the coin control selector, and conductor 48 to operatively energize the upper winding of relay 41 of the recording-completing trunk circuit OT2. The operation of relay 41 causes the operation of relays 42, 43 and 44 as hereinbefore described and closes a connection from the low tone source TN1 in the coin control selector circuit CCS, through a front contact of relay 64, a front contact of relay 68, tone condenser TNC, and bottom brush of selector CCS, conductor 49, a front contact of relay 41 to the upper winding of repeating coil 90, thereby transmitting a tone over the phantom circuit of trunks T1 and T2 through repeating coil 120, trunk circuit IT2 and cord 140 to the toll operator to indicate that the coin collect circuit is being closed. After relay 68 opens the operating circuit of relay 67, relay 67 is held operated by its upper winding as long as the ground connection through interrupter 38 is closed. When relay 67 releases, the winding of relay 59 is connected to the interrupter; and, as soon as the ground connection is again closed through interrupter 38, relay 59 operates. The operation of relay 59 closes a circuit for effecting the operation of the coin magnet 10 at the subscriber station 11 to collect the coins, this circuit being traced from coin collect battery CCB in the coin control selector circuit CCS, through a front contact of relay 64, winding of relay 69, front contact of relay 59, top brush of selector CCS and engaged terminal, conductor 47, a back contact of relay 40, front contacts of relay 41, front contacts of relay 43, front contacts of relay 42, contacts of relay 30, conductors 27 and 28, brushes 21 and 22 of selector 20, through coin trunk circuit 18, brushes 15 and 16 of line finder 14, conductors of line 12, and through the winding of coin magnet 10 to ground; whereby the coin magnet 10 is operated to collect the deposited coins. The coin collect current also effects the operation of relay 69 in the coin control selector circuit and relay 69 closes a circuit for holding relay 66 operated.

As soon as interrupter 38 opens the connection to ground, relay 59 releases. The release of relay 59 opens the circuit through relay 69, and relay 69 releases; but relay 66 is held operated through the back contact of relay 59. The next closure of the ground connection by interrupter 38 causes the reoperation of relay 59. If the coins were collected at the calling station by the first closure of the coin collect circuit, relay 69 is not reoperated and relay 66 releases. The release of relay 66 causes the release of relay 59 and opens the operating circuit of relay 68; but relay 68 is held operated as long as relay 60 is operated and relay 61 is released. When the coin collect key 148 is restored to normal, the above-described disconnection of battery 165 from, and reconnection of battery 164 to, conductor 112 causes the release of relays 84 and 53 in succession. The release of relay 53 causes the release of relay 52, whereby conductor 58 is again connected to ground at the front contact of relay 85; so that relay 61 reoperates, thereby causing the release of relay 68. When relay 68 releases, the tone source TN1 is disconnected from conductor 49 to terminate the transmission of tone through repeating coils 90 and 120 to the toll operator. The operator now removes the plug 149 from jack 150 causing the release of all relays in coin control trunk circuit CCT, whereby ground is again connected through resistors 161 and 163 and coil 113 to conductor 112 to cause the release of composite signaling relay 85 in the dial office. The release of relay 85 causes the release of relays 60 and 61 in the coin control selector circuit, followed by the release of relays 62, 64 and 65. With relays 61 and 62 released, the release magnet RLS is operated to restore the shaft and brushes to normal and springs RON and VON are also restored to normal, all in usual and well-known manner. The aforementioned release of relay 68 also disconnects ground from conductor 48, thus causing the successive release of relays 43 and 42 followed by the release of relays 45 and 41 in the recording-completing trunk circuit OT2.

When the call is completed and the calling subscriber replaces the receiver on the receiver hook, relay 31 releases followed by the release of relay 32. The release of relay 32 disconnects signaling battery from and connects ground to conductor 92 thereby causing the release of the composite signaling relay 125 in the toll office. The release of relay 125 disconnects ground from conductor 121 and connects ground to the low-resistance, upper winding of relay 135 to effect the lighting of the cord supervisory lamp 143 as a disconnect signal. When the toll operator disconnects cord 140 from jack 130, relays 135 and 136 release in succession. The release of relay 136 disconnects signaling battery from, and reconnects ground to, conductor 122 to cause the release of composite signaling relay 95 in the dial office. The release of relay 95 causes the successive release of relays 35, 36 and 33, whereby trunk circuit OT2 is restored to normal and ground is disconnected from conductor 29 to release the selector and line finder switches and restore all associated apparatus to normal.

If the call cannot be completed after coins have been deposited at station 11 responsive to the toll operator's request, the operator returns the coins by connecting the coin control cord 145 to jack 150, the dialing of the number of the recording-completing trunk OT2, and the operation of the coin return key 147. The operation of trunk circuit CCT, coin control circuit CC and coin control selector circuit CCS to connect with the trunk circuit OT2 are the same as above-described. When the coin return key 147 is operated, relays 153, 152 and 160 are released. The release of relay 160 disconnects battery 164 from signaling conductor 112 and connects ground through resistors 161 and 163 and front contacts of relays 154, 155 and 159 to conductor 112 to cause the release of composite signaling relay 85. The release of relay 153 opens the operating circuits of relays 154 and 155 and the release of relay 152 opens the locking circuit of relay 155. Relay 155 releases but relay 154 is slow in releasing and the release of relay 155 closes a circuit through its lower back contact for holding relay 154 operated under the control of relay 159. The release of relay 155 disconnects ground from signaling conductor 112 and connects battery 166 to conductor 112 and causes the successive release of relays 157, 158 and 155. Battery 166 is of high enough voltage to cause the operation of marginal relay 84 in the dial office and is of opposite polarity to that of batteries 164 and 165 so as to be ineffective to cause the operation of relay 85. Relays 157 and 158 are slow in releasing to insure the connection of battery 166 to conductor 112 for an interval sufficient for the operation of relay 84. When key 147 is restored to normal, relays 153 and 152 reoperate. The reoperation of relay 153 causes the reoperation of relays 155, 157, 158 and 160. The reoperation of relay 155 reconnects conductor 112 to ground through resistors 163 and 161, thereby causing the release of relay 84; and the reoperation of relay 160 again connects battery 164 to conductor 112, causing the reoperation of relay 85 without reoperating relay 84.

In the dial office, the aforementioned release of relay 85 disconnects ground from conductor 81 thereby causing the release of relays 60 and 61; and the subsequent operation of relay 84 causes the operation of relay 53. Relay 53 connects ground through high resistance element 56 to conductor 58, and connects the winding of relay 52 to ground at the back contact of relay 85. Relay 52 locks under control of relay 53, connects ground to resistor 56, and disconnects the winding of relay 54 from conductor 81. When relay 85 reoperates and relay 84 releases due to the aforementioned disconnection of battery 166 from and reconnection of battery 164 to conductor 112 at the time the coin return key is released, relay 53 releases, followed by the release of relay 52. With relays 52 and 53 normal, ground is again connected from the front contact of relay 85 through conductor 81 and back contacts of relays 52, 53, 51 and 54 to conductor 58. During the time the high resistance element 56 is connected in series with conductor 58, relay 60 is reoperated without reoperating relay 61 and without operating relay 64 of the coin control selector circuit. With relay 60 operated, relay 62 is operated; and, with relay 61 normal, relay 66 operates and locks, relay 68 operates and locks, and relays 41, 42, 43 and 44 of trunk circuit OT2 are operated as hereinbefore described. When relay 59 operates and since relay 64 is not operated, the coin return battery CRB is connected through a back contact of relay 64, winding of relay 69, a front contact of relay 59, top brush of selector CCS, conductor 47, a back contact of relay 40, front contacts of relays 41, 43 and 42, contacts of relay 30 and conductors 27 and 28, through selector 20, coin trunk circuit 18, line finder 14 and line 12 to the coin magnet 10 of station 11; and the high tone source TN2 is connected through the inner lower back contact of relay 64, a front contact of relay 68, condenser TNC, bottom brush of selector CCS, conductor 49 and a front contact of relay 41 to repeating coil 90 to transmit tone to the toll operator to indicate that coin return battery is being applied to return the coins deposited at station 11. As soon as interrupter 38 opens the connection to ground, relay 59 releases. The release of relay 59 opens the circuit through relay 69; and relay 69 releases; but relay 66 is held operated through the back contact of relay 59. The next closure of the ground connection by interrupter 38 causes the reoperation of relay 59. If the coins were returned by the first closure of the coin return circuit, relay 69 is not reoperated and relay 66 releases. The release of relay 66 causes the release of relay 59. When relays 53 and 52 release, due to the release of relay 84 and reoperation of relay 85 resulting from the release of the coin return key 147 as above described, relay 61 reoperates and relay 68 releases, thereby terminating the transmission of tone from source TN2 to the toll operator and disconnecting ground from conductor 48 to cause the successive release of relays 43, 42 and 41. When the coin control cord 145 is disconnected from jack 150 the coin control trunk circuit CCT, coin control circuit CC, and coin control selector circuit are restored to normal in the manner hereinbefore described.

What is claimed is:

1. In a telephone system, a dial central office comprising subscribers' lines, coin stations of the prepayment type connected to some of said lines, another office including an operator position, trunks between said offices arranged to provide a plurality of talking channels and a plurality of composite signaling channels between said offices, trunk circuits in said dial office, one for each of said talking channels, means comprising one of said talking channels and the associated one of said trunk circuits connecting said position to one of said coin lines, a coin control cord at said position, a switch in said dial office individual to one of said composite signaling channels, said switch having access to said trunk circuits, means comprising a dial associated with said cord and comprising said one signaling channel for operating said switch to connect with said one of the trunk circuits, coin control potential sources associated with said switch, means associated with said one of the composite signaling channels and controlled by the coin collect and coin return keys of said cord for selectively transmitting coin control signals over said one signaling channel, and means in said dial office controlled by said coin control signals for effecting the conection of the desired one of said coin control potential sources to said one trunk circuit to cause the collection or the return of coins deposited at the coin station of said coin line as desired.

2. In a telephone system, a central office including a subscriber's line and station of the prepayment coin type, a trunk circuit, an operator position including a dial, means including said trunk circuit connecting said station to said position, a trunk between said position and central office arranged for composite signaling, a coin control cord at said position and coin control keys associated with said cord, a coin control selector in said central office having access to said trunk circuit, means including said dial and coin control cord and a composite signaling channel of said trunk for selectively operating said selector to connect with said trunk circuit, potential sources in said central office, one for effecting the collection and another for effecting the return of coins deposited at a coin station, and means associated with said selector and trunk circuits and controlled by said coin control keys over said composite signaling channel for selectively effecting the connection of the desired one of said potential sources to said coin subscriber's line.

3. In a telephone system, a central office including a subscriber's line and stations of the prepayment coin type, an operator position including a dial and a coin control cord and associated coin control keys, a trunk between said position and central office, said trunk being arranged for composite signaling thereover, a coin control selector in said central office, signal receiving means associated with said selector and arranged to receive selective and coin control signals over a composite signaling channel of said trunk, a coin control trunk circuit connected to the other end of said channel, means in said trunk circuit controlled by said dial for transmitting dial impulses over said channel to operate said selector to establish connection with said subscriber's line, potential sources associated with said selector, one for effecting the collection and another for effecting the return of coins at said subscriber's station, and means in said trunk circuit selectively controlled by said keys for transmitting coin control signals over said signaling channel to said signal receiving means, and means associated with said selector and controlled by said signal receiving means to connect the desired one of said potential sources to said subscriber's line.

4. In a telephone system comprising a central office including subscriber lines and stations of the prepayment coin type, an operator position, a trunk between said position and central office, means connected to said trunk providing a composite signaling channel over one of the conductors of the trunk, a dial, a coin control cord and coin control keys at said position, a coin control selector in said central office for use in effecting the collection or return of coins deposited at a coin station, signal receiving means in said central office connected to said composite signaling channel of said trunk for controlling the operation of said selector, and signal transmitting means controlled by said cord, dial and keys for transmitting dial impulses and coin control signals over said signaling channel to said signal receiving means to selectively control the operation of said selector to establish connection with a desired subscriber line and effect the collection or refund of coins deposited at the subscriber station as desired.

5. In a telephone system comprising a central office including subscriber lines and stations of the prepayment coin type, an operator position including a dial, a coin control cord and coin control keys, a trunk between said position and central office, means connected to said trunk providing a composite signaling channel over one of the conductors of the trunk, signal receiving means in said central office arranged to receive selective and coin control signals over said composite signaling channel of said trunk, said signal receiving means including a polarized composite signaling relay and a non-polarized marginal relay connected in series to a conductor of said trunk, a coin control trunk circuit connected to the other end of said signaling channel including means responsive to the connection of said cord with said trunk circuit for effecting the operation of said polarized composite signaling relay, means controlled by said dial for effecting the alternate release and reoperation of said polarized composite signaling relay responsive to dial impulses, means controlled by one of said coin control keys for effecting the operation of said marginal relay while maintaining the operation of said polarized relay, and means controlled by the other of said control keys for effecting the operation of said marginal relay and the release of said polarized relay.

FREDERICK R. LAMBERTY.

REFERENCES CITED

The following references are of record in the file of this patent:

UNITED STATES PATENTS

| Number | Name | Date |
|---|---|---|
| 2,226,730 | Lomax | Dec. 31, 1940 |
| 2,385,720 | Molnar | Sept. 25, 1945 |
| 2,471,087 | Anderson | May 24, 1949 |